Oct. 22, 1963

N. ACKERMAN 3,107,581

HYDROPNEUMATIC FEED DEVICE

Filed May 22, 1958

INVENTOR.
NATHAN ACKERMAN

Oct. 22, 1963    N. ACKERMAN    3,107,581
HYDROPNEUMATIC FEED DEVICE
Filed May 22, 1958    7 Sheets-Sheet 3

INVENTOR.
NATHAN ACKERMAN

FIG. 8

INVENTOR.
NATHAN ACKERMAN

United States Patent Office 3,107,581
Patented Oct. 22, 1963

3,107,581
HYDROPNEUMATIC FEED DEVICE
Nathan Ackerman, 4 Merivale Terrace,
Lake Success, N.Y.
Filed May 22, 1958, Ser. No. 737,092
6 Claims. (Cl. 91—275)

This invention relates to a novel reciprocating mechanism for the control of a turret lathe, sometimes referred to as a screw machine. More particularly it relates to a hydropneumatic feed device for machine tools.

In working with turret lathes and other machine tools it is desirable that the tool be advanced rapidly from its starting position to a position immediately adjacent the workpiece since the tool, during this movement, is not active and no work is being performed. Once the tool contacts the workpiece however, or its about to do so, it is necessary that its rate of advance be slowed down so that the tool advances along the workpiece at an appropriate rate for the particular material, tool and operation being performed. On the return stroke of the machine tool, it is desirable that the tool be withdrawn from contact with the workpiece at another rate appropriate for maximum speed of operation and consistent with the tool, workpiece material and operation performed thereon.

It is therefore an object of this invention to provide a reciprocating feed and control mechanism for a turret lathe or other screw or similar machine which can be attached efficiently to such existing machine at highly desirable locations without the extensive or material modification of such machines, and which is compact in construction and stable in operation requiring a minimum of adjustment.

Still another object of this invention is to provide a control mechanism which combines the advantages of rapid cushioned movement due to compressed air and careful controlled advance and return due to the hydraulic fluid, while avoiding the shortcomings of these media.

Yet another object of the invention is to provide such machine tool with a control mechanism which is correspondingly indexed and permit a complete cycle of work to be performed automatically for each such index position.

A further object of this invention is to provide a mechanism of the character indicated in which a novel arrangement of concentric cylinders is employed in order to achieve a higher degree of efficiency of operation and stability and to provide for the required cycle of functions in a most simple, convenient and effective manner.

These and other objects are realized in accordance with the present invention wherein the entire device is mounted upon the saddle of a turret lathe or similar machine and wherein the reciprocal movement of the tool slide is controlled by a piston rod assembly carrying a pair of concentrically disposed pistons, the first of said pistons being disposed in an oil cylinder and the second of said pistons being disposed in an air cylinder surrounding said oil cylinder, arranged concentrically therewith and forming a jacket therefor. When the tool slide is to be actuated, compressed air is fed behind the air piston head so that it advances rapidly, air being vented in front of said piston head. Since the air and oil piston heads form part of a common assembly connected externally of the cylinders, the oil piston is simultaneously moved forwardly. The oil being displaced by the movement of the oil piston is recirculated through an appropriate primary path to the opposing end of the cylinder including a by-pass arrangement permitting the rapid advance of the piston assembly and consequently of the tool slide. When it is desired to retard the advance of the tool slide and reduce the rate of movement thereof at a preselected point, a secondary oil path is interposed in the oil path, metering the recirculating oil, and consequently retarding the rate of the continued advance of the piston assembly and tool slide the point being preselected for each index position of the machine tool and the rate being appropriate for said position. Similarly upon the return of the tool slide by means of the reversal of movement to the piston assembly, the rate of return movement of the slide and piston assembly is appropriately retarded at a preselected point to a preselected rate for the particular index position in use by the interposition of a retractive metering arrangement in the path of the circulating oil, as part of said secondary oil circuit. Again at a preselected point in the return movement of the slide and piston assembly the secondary circuit is by-passed to permit the completion of the retractive movement of the slide and piston assembly at its initial high rate of speed. Upon indexing movement of the machine tool to each succeeding index position, the cycle is repeated in accordance with rates and settings suitable for such subsequent position. All of the foregoing and related functions being performed in a highly efficient and desirable manner by the cylinder arrangement, associated parts, control elements and circuits.

Other and further objects of this invention will become apparent from the description thereof contained in the annexed specifications, or will otherwise become obvious. It will be understood that the invention here disclosed may be employed for other purposes to which the structure and arrangement are adapted.

FIGURE 16 is a flow diagram of the pneumatic and hydraulic systems utilized in the present invention.

Figures 1, 12, 13, 14, 15:
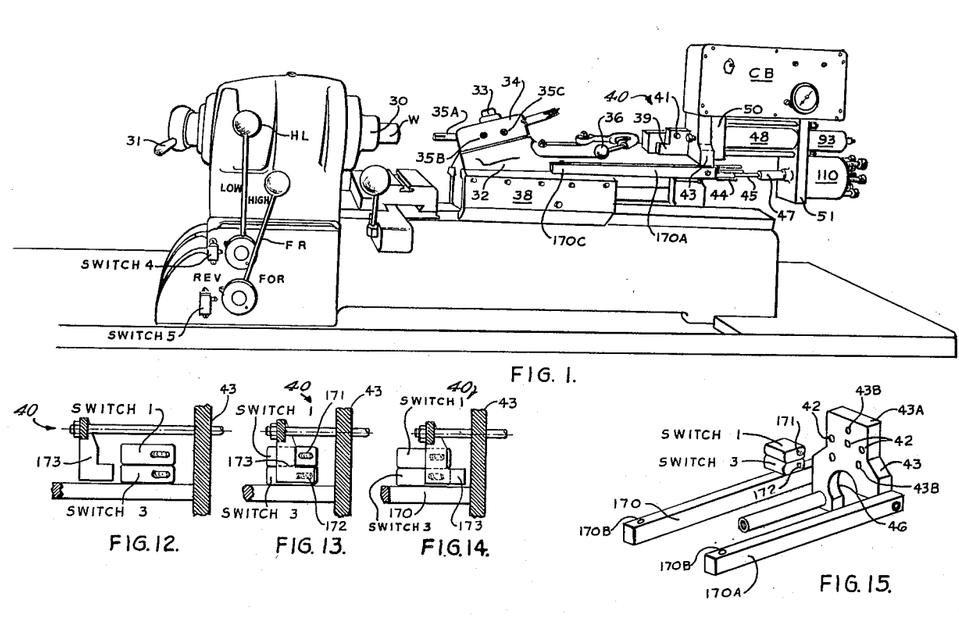
FIGURE 1 is an elevational view of a turret lathe having a tool slide reciprocated by the mechanism of the present invention.
FIGURES 12, 13 and 14 are fragmentary views of the piston assembly and mounting plate showing the sequence of part of the switch control arrangement.
FIGURE 15 is a persepctive view of the mounting plate arrangement.
Figure 1B:
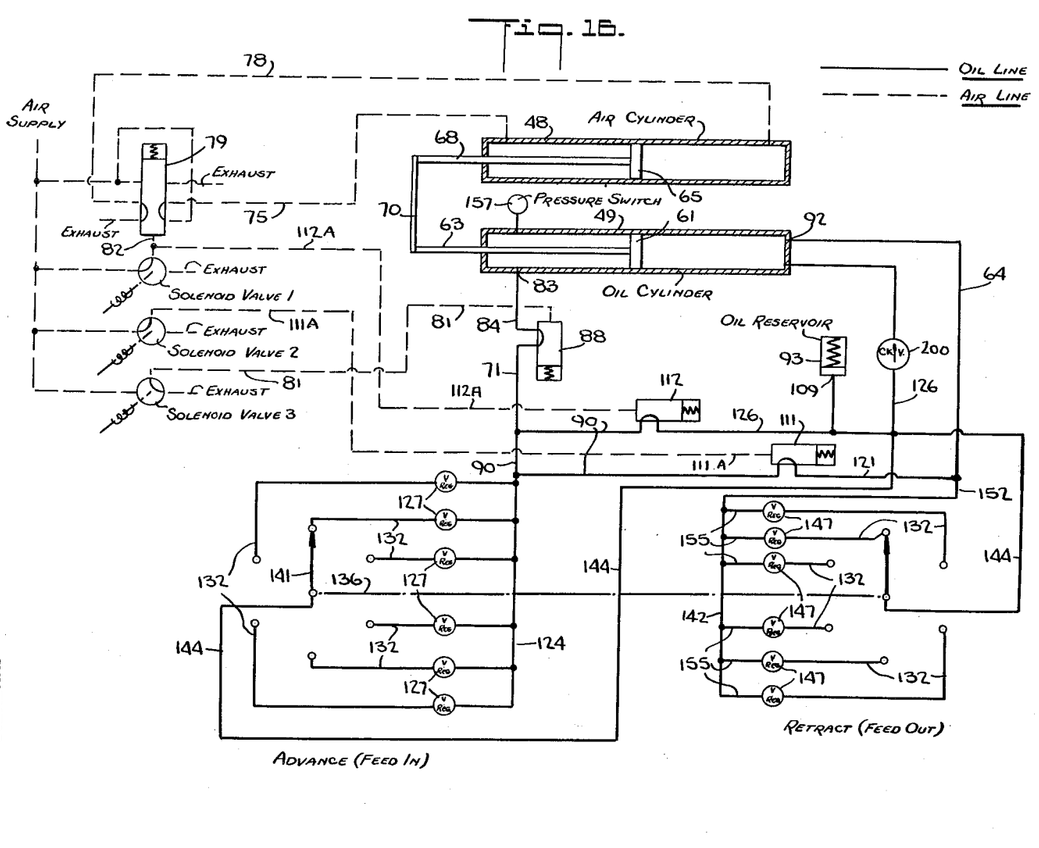

Referring now more particularly to the drawings, the screw machine shown in FIGURE 1 comprises a collet chuck 30 for holding workpiece W. The jaws of the chuck can be opened and closed manually by means of a lever 31. Upon actuation of the machine, the chuck 30 with the workpiece W will be rotated about the axis of the workpiece. The bed of the machine also carries a saddle 38 which may be selectively fixed in any position along the bed. The saddle 38 in turn carries a slide member 32 which is longitudinally displaceable towards and away from the workpiece. At its left hand end, the slide member 32 is provided with an inclined shaft 33 about which there is rotatably mounted a turret 34 provided with six tool holders 35, each designated 35A, 35B, etc.

The slide member may be displaced manually by means of lever 36 or it may be operated automatically, as will be described more fully hereinafter. The internal construction of the slide member is conventional and is so designed that when the slide member 32 reaches its right hand end position the turret 34 is rotated through the angle of 60° to present the next tool 35B. The slide member 32 may then be advanced to the left to contact the tool 35B with a rotating workpiece W held by chuck 30, the advance being effected by manually operating lever 36. Preferably, however, the advance of the slide member 32 is effected and regulated by means of the actuating apparatus shown at the right hand side of FIGURE 1. Specifically a bifurcated projection 39 is provided on slide member 32 and a piston assembly 40 is connected to the projection 39 by means of a removable pin 41. The piston assembly 40 extends through aperture 42 provided in a mounting bracket 43 which is bolted to the saddle 38 of the screw machine. With the apparatus so far described, it is apparent that the slide member 32 and the piston assembly 40 are linked for simultaneous longitudinal movement. Projecting from the right hand end of slide member 32 are an assembly of six threaded rods 44 and a central shaft 45 aligned so as to be capable of movement through an opening 46 in the mounting bracket 43. Each of the rods 44 corresponds to a particular holder 35 of the turret 34, a 60° indexing movement of the turret producing a corresponding 60° rotation of the assembly of threaded rods 44 as well as central shaft 45 and consequently of indexing shaft 47 of the operating unit. The threaded rods are mounted on the lathe for simultaneous movement with the slide 32 and may be longitudinally adjustably positioned so as to provide means for limiting the movement of the slide in the direction of the workpiece W. This limiting action is accomplished by the abutment of the left hand end of the particular rod 44 in index position with an abutment stop fixedly carried by the lathe. By this means, the extent of the movement of the tool with respect to the workpiece is effectively and positively stopped at the precise point desired for each tool.

Figure 2:
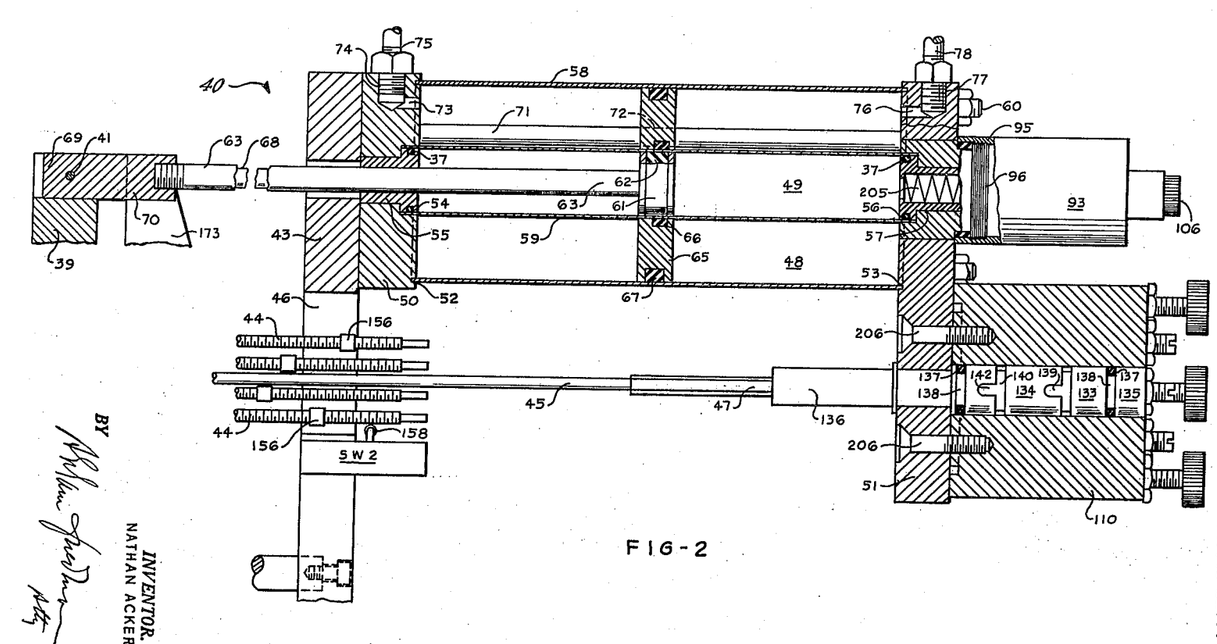
FIGURE 2 is a vertical section taken principally medially through the reciprocating mechanism of FIGURE 1, with the control box removed, and showing portions of the turret lathe.
Figures 3, 9, 10, 11:
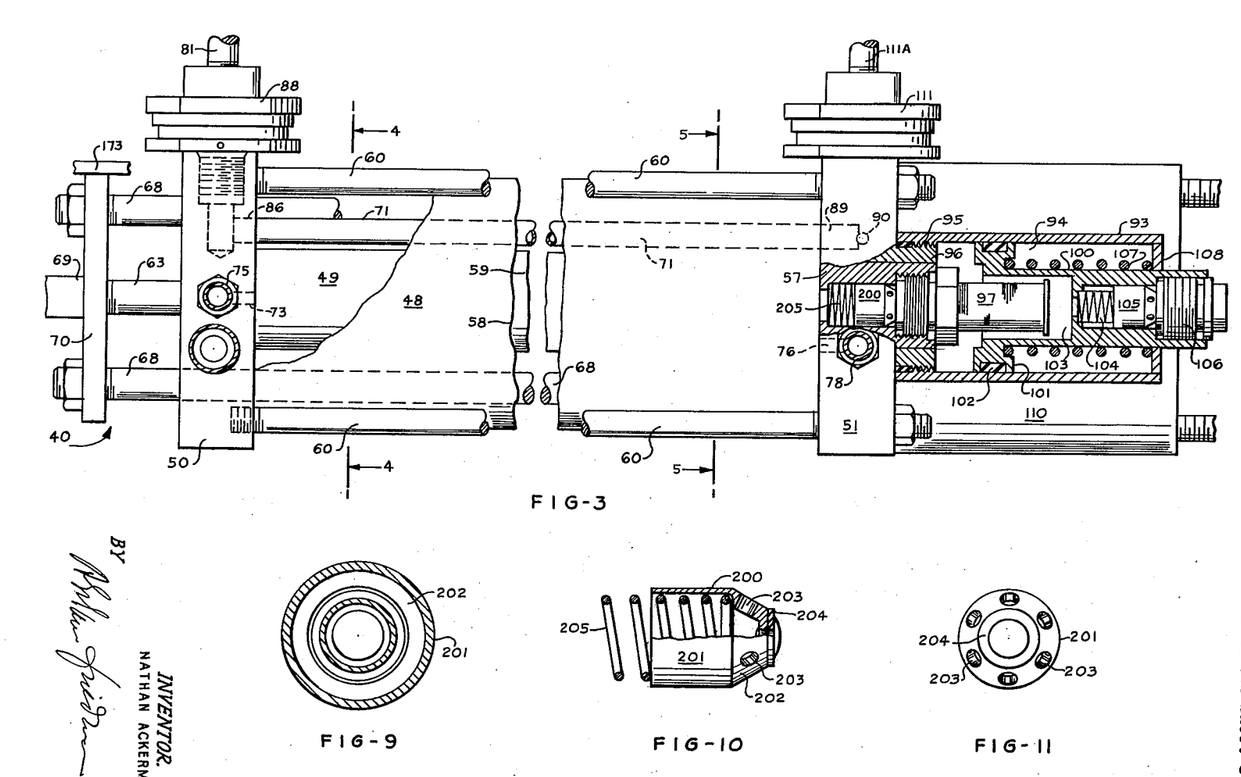
FIGURE 3 is a top plan view of the reciprocating mechanism of FIGURE 1 on a different scale, with the control box removed, partly broken away and showing the oil reservoir in horizontal section.
FIGURES 9, 10 and 11 are views of the check valve arrangement.

Referring now to FIGURES 2 and 3, which more particularly illustrate the reciprocating operating unit comprising the present invention, a pair of concentric cylinders 48 and 49 are supported between a head block 50 and a distributor plate 51. Cylinder 48 comprises an air or pneumatic actuating cylinder for the operating unit, while cylinder 49 disposed therein comprises an oil or hydraulic control or governing cylinder for the operating unit. The cylindrical side wall 58 of the outer air cylinder 48 is seated in suitable annular grooves 52 and 53 formed in the confronting surfaces of the head block 50 and distributor plate 51 respectively, in air tight sealing engagement therewith. The cylindrical side wall 59 of the inner oil cylinder 49 is retained in position in the annular groove 54 formed at the juncture of the bushing 55 and the body of the head block 50 and a similar annular groove 56 formed at the juncture of bushing 57 and distributor plate 51. A liquid tight seal is formed at each end of the hydraulic cylinder 49 by means of suitable sealing gaskets, such as O rings 37. As is apparent, the enclosure of the air and oil cylinders is accomplished by means of the headblock 50 and the distibutor plate 51 which are held securely in sealed engagement with the ends of cylinder walls by means of tie rods 60. The piston assembly 40, comprising a piston within each of the cylinders respectively, is disposed for reciprocal movement within the cylinders 48 and 49. Said piston assembly 40 includes a piston 61 disposed within oil cylinder 49. A suitable piston ring 62 provides a seal between the head of said piston 61 and the interior surface of the side wall 59 of cylinder 49 while allowing for the axial reciprocal movement of the piston within the cylinder. Piston 61 includes a piston rod 63 which extends from the piston head thereof externally of the cylinder through bushing 55.

Disposed within the air cylinder 48 is an axially reciprocable annular piston 65, which is provided with a central opening through which the oil cylinder extends and which is provided with inner piston ring 66 providing sealing engagement with the exterior surface of air cylinder wall 59, and an outer piston ring 67 which provides sealing engagement with the interior wall surface of the air cylinder wall 58. The piston rings 66 and 67 permit the axial reciprocal movement of the piston head 65 within cylinder 48. It is apparent therefore that the annular head of piston 65 surrounds the hydraulic cylinder and moves therealong. Piston rods 68 are connected to piston 65 at diametrically opposing points on the piston head thereof and extend externally of the pneumatic cylinder by passing through suitable bushings provided in the head block 50. It will be noted that by reason of the diametrically opposed disposition of piston rods 68, said rods are located in horizontal alignment with piston rod 63 which is disposed therebetween. A crossbar 70 is secured to the ends of all of the piston rods so as to form the unitary piston assembly designated by the numeral 40 whereby the concentric oil and air pistons are interconnected for simultaneous reciprocal axial movement in their respective cylinders. A boss 69 projecting forwardly from crossbar 70 is received between the arms of the bifurcated projection 39 on the lathe slide, said boss being provided with a transverse aperture which is in alignment with similar apertures in the projection 39 so that by the insertion of a removable pin 41 through said apertures, the reciprocal movement of the piston rod assembly 40 is communicated to the lathe slide member 32.

Disposed within air cylinder 48 and extending between the cylinder head block 50 and the distributor plate 51 is oil return tube 71. The ends of tube 71 are seated within bores formed in said block and plate respectively and communicate with valves, ducts and passageways for the oil to be hereinafter described. An opening 72 is provided extending through the head of air piston 65, said opening being lined with a suitable sealing means so that said piston head may be axially reciprocated along the length of said tube 71 without leakage from one side of said piston head to the other.

Figure 4:
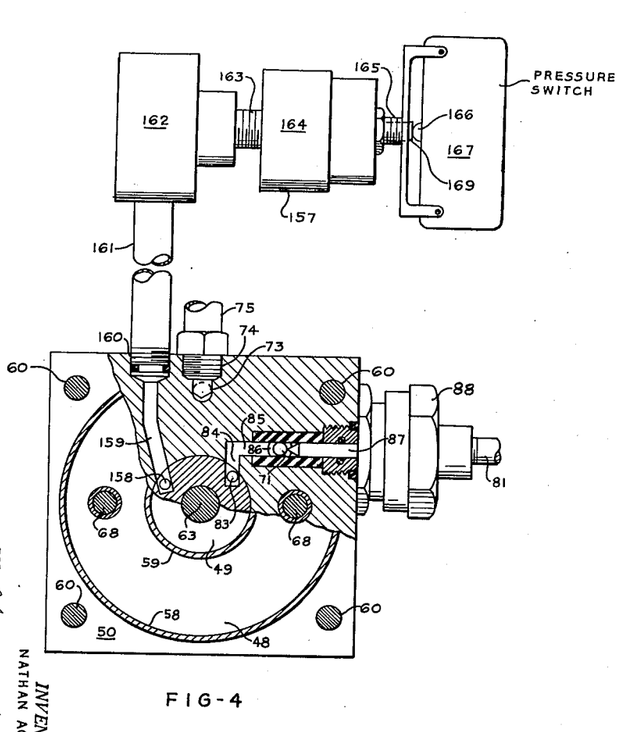
FIGURE 4 is a cross-section of FIGURE 3 taken along line 4—4 thereof, showing the head block partly broken away.
Figure 5:
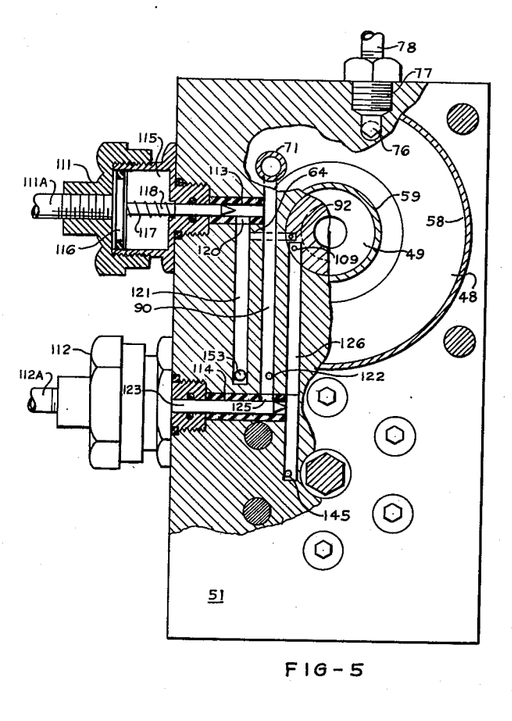
FIGURE 5 is a cross-section of FIGURE 3 taken along line 5—5 thereof showing the distributor plate partly broken away.

The pneumatic or air circuit may be more particularly seen from FIGURES 2, 4 and 5. A port 73 is formed in headblock 50 and opens into the interior of cylinder 48. Port 73 communicates with opening 74 within which a conduit 75, having a suitable threaded fitting at the end thereof, is received. As may additionally be seen from FIGURE 5, a similar port 76 is provided in distributor plate 51 and opens into the opposing or rear end of the air cylinder and communicates with opening 77 within which conduit 78 having a suitable terminal fitting is threadedly received.

Figure 8:
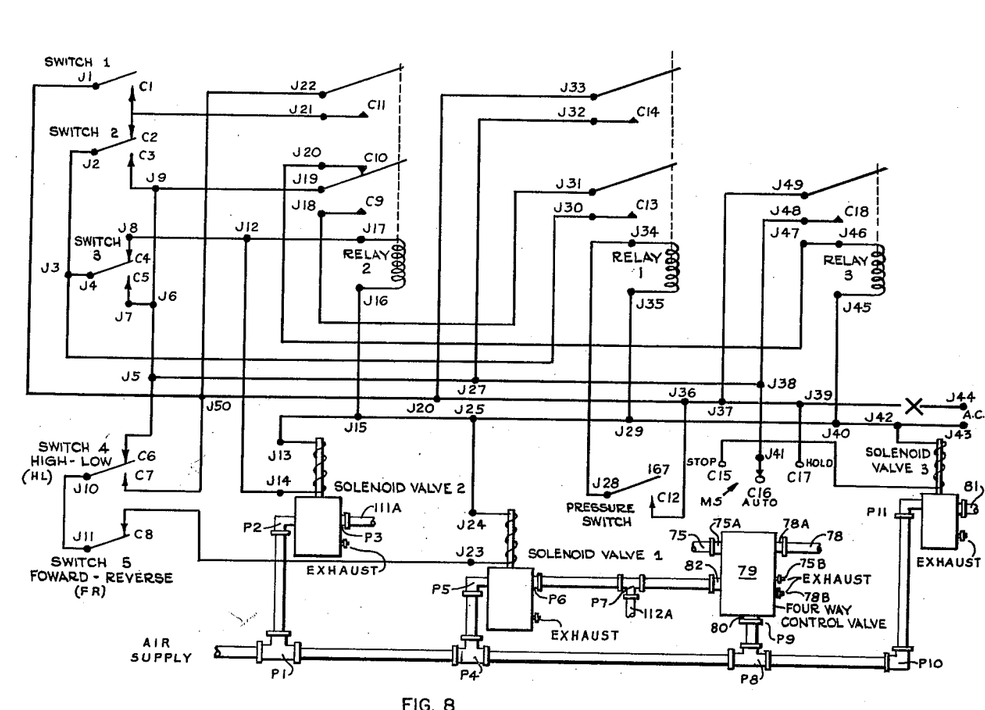
FIGURE 8 is a schematic view of the control electrical and pneumatic circuit arrangement disposed within the control box.

Conduits 75 and 78 are connected to a suitable pneumatic supply source, as for example a compressed air supply through a four way air control valve 79. The admission of air under pressure to the opposite ends of the cylinder 48, and the discharge or venting of air therefrom is controlled by said valve 79. Valves of this type are conventional and well known in the art and said valve is illustrated in block form in FIGURE 8. As stated, four way control valve is of conventional design and is continuously supplied with compressed air from a suitable supply source through air supply port 80. Valve 79 also includes a pair of outlet ports 75A and 78A to which are connected the conduits 75 and 78, as well as exhaust ports 75B and 78B, through which the return flow of air is exhausted to the atmosphere as required. The valve 79 is actuated by means of compressed air introduced into the valve body through control port 82. The internal valve arrangement is such that in unactuated condition, i.e., when no air is applied to the valve through the control port 82, the valve provides a passage from the compressed air supply port 80 to the port 75A and an air exhaust path being simultaneously internally provided from the exhaust port 78B. Upon the introduction of air through control port 82, the valve is actuated to its alternate position so that compressed air from the supply source now flows into conduit 78 through port 78A and the return flow of air now carried by conduit 75 to port 75A is discharged to the atmosphere through exhaust port 75B. Upon the discontinuance of the air to the control port 82, the valve 79 returns to its initial condition again reversing the flow of air therethrough. Thus the direction of flow of air is alternately reversed as between conduit 75 and 78 by means of the four way valve 79.

When compressed air from four way valve 79 is introduced into the left hand or proximal end of the air cylinder 48 with respect to the slide, through conduit 75, the entire piston assembly will be caused to move to the right, toward the distal end thereof, thus discharging to atmosphere the low pressure air ahead of the air piston 65 through port 76, opening 77 and air conduit 78. On the other hand, when the supply of compressed air is reversed and is introduced through conduit 78 into the right hand or distal end of the air cylinder 48, the piston 65 in the air cylinder will be caused to move in a forward direction and the low pressure air ahead of the piston will then be discharged to atmosphere through port 73, opening 74 and through air conduit 75.

It will be apparent from the foregoing that the entire piston assembly 40 including the oil piston is thus caused to be reciprocated under the power of compressed air as it is introduced into either the forward proximal or rearward distal end of the air cylinder 48, which thus acts as a power, i.e. drive or motive, cylinder for said assembly. It will also be apparent that by reason of the reciprocation of the piston in the air cylinder, the slide member 32 of the lathe is caused to be simultaneously reciprocated due to the coupling between the cross bar 70 and the bifurcated projection 39 secured to the slide. The forward or advancing movement of the piston assembly will cause the tool held by the slide turret to approach the workpiece and to be engaged therewith and moved therealong for the performance of the appropriate operation thereon. On the other hand, when the piston assembly moves rearwardly or retracts, the tool held by the turret will be withdrawn from the workpiece and the slide is thus returned to its initial position. As heretofore stated, it is required that the slide approach the workpiece rapidly so as to minimize the time required for such approach and it is further required that the tool be caused to engage the workpiece at the rate determined by the characteristics of the material of the workpiece and the particular operation being performed thereon. By the same token, in withdrawing the tool from the workpiece, it is required that the rate of retraction be controlled so as to avoid harmful effects upon the workpiece and tool. Having been withdrawn from the workpiece, the tool and the slide upon which it is mounted return to their initial position as rapidly as possible to conserve idle machine time.

In order to accomplish these controlled functions, the control or governing hydraulic oil cylinder 49 is concentrically disposed in said air cylinder in spaced relation to the side wall 58 thereof and is provided with a piston which forms part of the piston assembly and is arranged so as to restrain or control the rate or speed of movement of the entire piston assembly in the course of its reciprocation in each direction against the full influence of the compressed air introduced in the power or air cylinder.

The hydraulic or oil cylinder 49 is completely filled with oil or other suitable hydraulic, i.e., inelastic, fluid and ports are provided opening into the head block 50 and distributor plate 51 for permitting the oil displaced by the oil piston to flow through a system of passages, conduits and metering means which control the rate of oil flow and consequently the rate of advance or retraction of the piston. The oil is circulated and returns into the opposing end of the oil cylinder through the opposing port. As a consequence of this arrangement, the rate of movement of the entire piston assembly 40 and consequently the lathe slide, turret and tool is determined by the degree of restraint imposed upon the oil piston by restrictions to oil flow interposed in the closed oil circuit associated therewith.

More particularly, as may be seen from FIGURES 3 and 4, an oil port 83 is provided in headblock 50 which opens into the interior of the left hand or forward end of oil cylinder 49. Said port 83 communicates with duct 84 which in turn opens into valve bore 85. Opening 86 communicates with valve bore 85 and provides a seat within which an end of oil return tube 71 is received. Suitable sealing rings (not shown) are provided about a said end of the return tube 71 to form an oil tight seal with the wall of the said opening 86. The arrangement is such that the valve pin 87 of valve 88 will control the flow of oil between oil duct 84 and opening 86. Consequently, valve 88 controls the flow of oil between port 83 in the oil cylinder 49 and the oil return tube 71. Valve 88 is operated by air supplied through conduit 81 and is similar in construction to valves 111 and 112 to be described. The actuation of the valve 88 completely cuts off any oil flow between the interior of the left hand side of the cylinder and the oil return tube.

Figure 6:
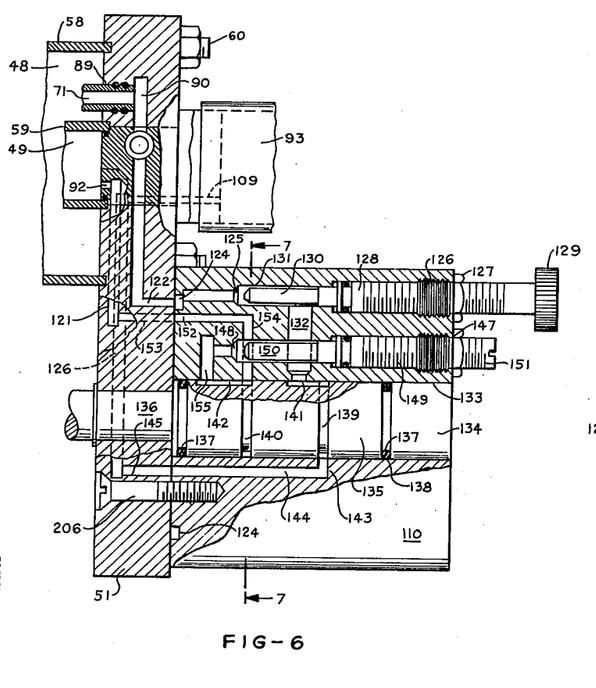
FIGURE 6 is a cross-section of FIGURE 7 taken along line 6—6 thereof.
Figure 7:
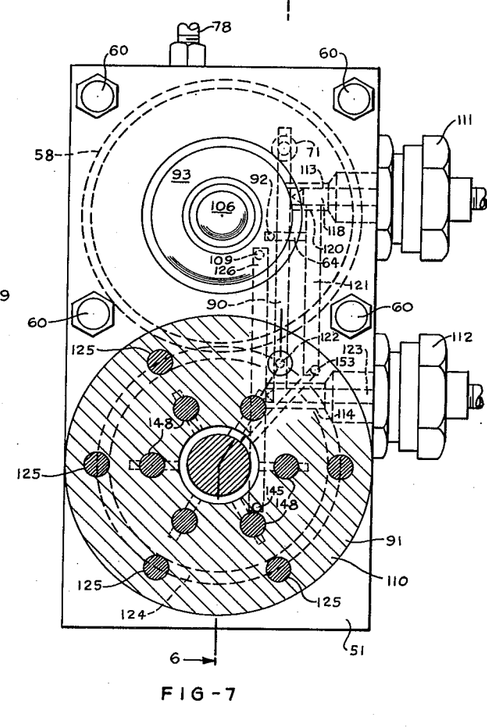
FIGURE 7 is a cross-section of FIGURE 6 taken along line 7—7 thereof.

Oil return tube 71 extends from headblock 50 through air cylinder 48 into opening 89 formed in distributor plate 51 (see FIGURES 3 and 6). Suitable sealing rings are provided about the distal end of the oil return tube 71 to form an oil tight seal with the side wall of said opening. Opening 89 in turn communicates with a vertical passageway 90 formed in the body of the distributor plate 51, as may be more clearly seen from FIGURES 5, 6 and 7. A network of passageways, ducts and valves is provided in the distributor plate 51 and distributor block 110 mounted thereon, which perform the oil flow control and metering functions referred to above. After passage through this arrangement, the circulating oil may enter the right hand or rear end of the oil cylinder 49 through two possible routes. Said oil may flow into the rear end of the oil cylinder through port 92, or oil may enter said rear portion of the oil cylinder through a one way check valve arrangement 200 which permits one way communication between the oil reservoir 93 and the interior of the rear end of the oil cylinder.

Oil reservoir 93 comprises an arrangement whereby the entire oil cylinder circulating system is at all times maintained in oil filled condition. The reservoir 93 compensates for the difference in the amount of oil required to keep the cylinder system filled in spite of the variations in oil displacement resulting from the reciprocation of the oil piston rod into and out of the oil cylinder. Any oil leakage which might result from the operation of the device is thus also compensated for. As may be more particularly seen from FIGURE 3, the reservoir 93 comprises a cylindrical body 94 which is provided with a threaded end portion as shown at 95. The internally threaded portion 95 of the cylinder is mounted upon the externally threaded portion of the mounting plug 96. Plug 96 is provided with a central bore within which an oil filter element 97 of conventional type is mounted. Oil filter element 97 communicates with a bore extending through the bushing 57 within which a one way check valve 200 is disposed. The one way check valve 200 may be of conventional construction permitting the passage of oil from the filter element into the rear portion of the oil cylinder, but preventing the flow of oil in the reverse direction. Said check valve 200 advantageously comprises a plunger 201 which is spring biased against a valve seat formed in the bore of bushing 57. The construction of the one way check valve 200 may be more particularly seen in FIGURES 9, 10 and 11. Said valve 200 comprises a hollow cylindrical plunger 201 having a frusto-conical end portion 202 provided with circumferentially spaced apertures 203. A seating gasket 204 is mounted upon the small end of the frustum of the frusto-conical section 202 and is adapted to sealingly engage a complementary valve seat in the bore of bushing 57. Spring 205 resiliently urges the plunger 201 to closed position against the seat. When the pressure of oil in the reservoir 93 against the gasket 204 exceeds the biasing pressure of the spring 205 in the opposing direction, the plunger 201 is moved from its seat and exposes apertures 203, thus permitting the passage of oil through said apertures into the rear portion of the oil cylinder.

The oil reservoir 93 further includes an annular reciprocable piston 100. Piston 100 comprises a cylindrical body provided with an annular piston head 101. A piston sealing ring 102 forms a seal with the interior of the reservoir cylinder wall while permitting the reciprocation of the piston within the cylinder. Piston 100 is formed with an enlarged bore 103 which provides clearance with respect to the body of filter element 97 and with a reduced bore 104 within which a one way check valve 105 similar to check valve 200, heretofore described, is disposed. A closure plug 106 is threadedly received in the rear end of the piston 100 and forms an oil tight closure seal therefor. A coil spring 107 surrounds the piston 100, one end of the spring bearing against the piston head 101 and the other end portion thereof bearing against the annular end wall 108 of cylinder 94. Said spring 107 provides a biasing pressure which exceeds the biasing pressure of spring 205 and constantly urges the piston 100 in the direction of the oil cylinder 49, so that oil disposed within the reservoir cylinder in front of the piston 100 is constantly under the pressure of spring 107 and said oil is urged to flow through filter element 97 and through check valve 200 into the interior of the rear portion of the oil cylinder. It will be noted, however, that oil cannot flow in the reverse direction from the oil cylinder into the oil reservoir, since upon the retractive movement of the oil piston toward the right, the oil will be forced against the interior of the valve plunger 201 seating the valve and thereby checking any oil flow in this direction. The oil within the reservoir is in excess of that required to completely fill the remainder of the system and consequently serves to replenish the system in the event of any slight leakage during use. Furthermore, it will be evident that due to the variation in the amount of oil displaced by the oil piston rod 63 as it reciprocates in the oil cylinder 49, there is a variation in the volume of oil required to keep the system filled and vacuum free. The spring biased piston 100 within the reservoir 93 serves to provide an expansible chamber which compensates for this variation in volume. The arrangement of check valve 105 and plug 106 serves to permit the system to be filled and replenished as required. Upon the removal of the plug 106, a source of oil supply may be coupled to the piston and oil may be forced into the system by overcoming the bias upon the check valve 105. The fresh oil, thus introduced into the reservoir, must pass through the filter element 97 before it can enter the oil cylinder proper, so that the arrangement assures that any fresh oil entering the system will be adequately filtered against foreign matter which might adversely affect the operation of the device. In the course of the operation of the device, oil flows into the reservoir through port 109, as will more clearly appear hereafter, and may pass into the oil cylinder by flowing through the oil filter 97 and check valve 200.

The control rate of flow of oil into and out of the oil cylinder 49 and through the associated circuitous path provided therefor is accomplished by means of the distributor plate 51 and the distributor block 110 mounted thereon. It is preferred to form the distributor plate from a single block of metal within which the various passages and openings are disposed and form ducts, passageways and ports for the oil circulating therethrough. These passageways, etc., are advantageously formed by drilling into the body of the block and then inserting plugs in the undesired portions of the bores thus formed. This procedure is conventional in the art. The portions of the bores, which are thus plugged, have not been shown for purposes of clarity of illustration of the operative portions of such bores, which form the desired ducts, passageways and ports to be described. Distributor plate 51 is provided with a pair of air operated valves 111 and 112, which are threadedly received in the body of the distributor plate and are provided with valve bores 113 and 114 respectively, preferably lined with a sleeve of nylon or other suitable material. Air operated valves 111 and 112 are of similar conventional construction and, as shown in FIGURE 5, valve 111 comprises a hollow body 115 across which a piston or diaphragm 116 is disposed under the biasing action of spring 117. The diaphragm 116 is connected with a valve pin 118 for movement therewith, so that when compressed air is introduced into the valve body 115, the pressure exerted against the diaphragm will cause it to move axially and thereby displace the valve pin to actuated position. Upon removal of air pressure, the valve returns to normal position. Valve 111 is provided with an air conduit 111A and valve 112 with conduit 112A.

Air operated valves of this type are conventional in the art. Valve pin 118 of air operated valve 111 extends into sleeve lined valve bore 113 and when actuated extends across port 120, so as to prevent oil flow between vertical passageway 90 and vertical passageway 121. Valve pin 123 of air operated valve 112 on the other hand extends into sleeve lined valve bore 114 and, when the valve is actuated, said valve pin is moved laterally so that it extends across port 125 and thereby shuts off any oil flow between passageway 90 and passageway 126. The valve 112 is shown in actuated position.

Distributor plate 51 also has mounted thereon a distributor block 110 by means of screws 206. As may be seen from FIGURES 2 and 6, said distributor block 110 preferably comprises a solid metallic cylinder provided with an annular groove 124 disposed in the face thereof, which face is in sealing contact with the distributor plate 51. Said groove 124 is in registration with port 122 of the distributor plate. Oil flowing into passageway 90 from oil return tube 71 during the forward movement of the oil piston 61 thus enters groove 124 which provides communication with six controlled forward movement metering valve chambers 125 which are provided with threaded portions to receive the threaded ends of the valve bodies 127 disposed therein, as shown at 126. A valve rod 128 is disposed within each valve body 127 and can be advanced or withdrawn by manipulation of screw head 129. An independently formed valve pin 130 abuts with the end of the valve rod 128 and provides for a precise metering action. Valve pin 130 is formed so that a small clearance exists between the peripheral wall thereof and the metering portion 131 of the forward metering valve chamber to permit the restricted passage of oil through the clearance space thus formed. By advancing the valve rod 128 to the left in FIGURE 6, the valve pin 130 is simultaneously advanced through the metering portion 131 of the forward control valve chamber and the flow of oil therethrough is additionally restricted. Movement of the forward metering valve rod 128 and pin 130 in the opposing direction as to the right in FIGURE 6 will reduce the degree of restriction on the oil path. In operation, each of the screw heads 129 are adjusted in advance so that the respective valve rods and pins will close off the respective metering portions of the valve chambers to the desired extent. The forward metering valve pin 130 is maintained in abutment with its valve rod 128 by the oil pressure.

Each of the valve chambers 125 is also provided with its respective radial passage 132 which provides for oil flow therefrom to the central bore 133 of the distributor block 110. Rotatably disposed within central bore 133 is an indexing guide 134. Said indexing guide 134 comprises a cylindrical body 135, which is provided with an operating shaft 136. The body of the indexing guide is rotatably mounted in the central bore 133 provided in the distributor block and is machined to close tolerances, so that any material oil seepage between the cylinder and bore walls is prevented. The ends of the cylindrical portion of the guide are effectively sealed by means of O rings 137 disposed in grooves 138 formed in the body of the cylinder. The cylinder 135 is additionally provided with circumferential grooves 139 and 140 provided with depressed areas 141 and 142 respectively of limited circumferential extent (see FIG. 2). By reason of the foregoing arrangement of the indexing guide 134, five of the six radial passages 132 are closed off at all times by the wall of the indexing guide cylinder 135, while the sixth radial passageway 132 communicates with depressed area 141 in registration therewith and thence with circumferential groove 139. With each 60° rotation of the indexing guide 134 by means of shaft 136, a successive radial passageway 132 is exposed to the depressed area 141 for communication with circumferential groove 139, which in turn communicates with radial port 143 in the wall of the bore 133 of the distributor block, from whence an axially extending passageway 144 is provided extending through the body of the distributor block, which registers with port 145 in the distributor plate. Port 145 communicates with vertical passageway 126 in said distributor plate, which communicates in turn with port 109, opening into the interior of oil reservoir 93. The foregoing series of passages, ports and valves comprises a secondary circuit or path for the metered flow of oil during the controlled forward movement of the piston assembly 40 and slide 32.

The distributor block 110 includes a second series of retractive metering control valves, which form a secondary oil circuit selectively interposed in the oil flow path during the retractive or return movement of the piston assembly and tool slide. Said second series of metering valves is arranged, so that each retractive metering valve is in radial alignment with a corresponding forward metering valve for a particular index position. Said control valves are similar in construction and arrangement to the forward control metering valves heretofore described and are disposed in valve chamber 148. Each of valve bodies 147 includes a screw adjustable metering rod 149, which is in abutment with a metering pin 150. The degree of extension of the metering pin into its metering chamber is controlled by means of the adjustment of screw head 151. The distributor block is provided with an axial port 152, which registers with port 153 formed in the distributor plate in communication with vertical passageway 121. Axial port 152 is in communication with a radial duct 154, which in turn opens into circumferential groove 140 in the indexing guide cylinder 135. A depressed area 142 registers with only one of six radial ducts 155 at any one time, the surface of the cylinder wall blocking off the remaining five similar ducts. Each of radial ducts 155 communicates with its respective controlled return metering valve chamber 148, which in turn communicates with radial passage 132. For convenience in following the operation of the hydraulic system the passages 132 which are associated with the valve bodies 127 as well as with the valve bodies 147 have been duplicated in FIG. 16, being shown once in connection with the advance distributor and again and separately in connection with the retract distributor. Oil entering return controlled metering valve chamber 148 is forced through the clearance space between the metering pin 150 and the chamber wall, the degree of restriction of oil flow being determined by the extension of said valve pin in said chamber. Having passed through this metering restriction, the oil enters radial passage 132, from whence communication is provided through the depressed area 141 into circumferential groove 139 and thence into axially extending port 144, which communicates with vertical passage 126 in the distributor plate through port 145.

The index position of the indexing guide 134 is determined by the index position of the tool turret and for each position of the tool turret a single controlled forward metering valve and a single corresponding controlled return metering valve is interposed in the secondary oil circuit. The operating shaft 136 of indexing guide 134 is coupled to the indexing central shaft 45 of the tool slide through non-circular shaft 47 for telescopic rotational movement therewith so that upon each indexing 60° rotation of shaft 45 the indexing guide 134 is similarly moved, thereby disposing the pair of depressed areas 141 and 142 in registration with the openings associated with the next successive pair of controlled forward and return metering valves. The previously adjusted position of said valves corresponds to the requirements of the particular tool which is thus brought in operative relation with the workpiece. The distributor block arrangement for each index position of the tool turret provides a means for operatively controlling the interposition of a corresponding secondary oil path in the oil circuit.

As may be seen in FIGURE 2, each of the threaded rods 44 is provided with a bushing 156 longitudinally displaceable therealong. As the tool slide member moves rapidly to the left, carrying rods 44 therewith, the bushing 156 on the lowermost rod 44 contacts a micro-switch SW2 positioned adjacent the opening 46 in plate 43. When the bushing 156 in lowermost position passes the contact arm 158 of switch 2 said switch is instantaneously actuated thereby operating appropriate related circuits and valves to be more particularly described so as to interpose the secondary oil circuit. Controlled movement of the slide in the forward direction is thus initiated at this selectively predetermined point during the forward movement of the slide. This condition continues until the forward movement of the slide has been completed by the abutment of the left hand end of rod 44 with the lathe stop. Thereupon the slide movement is arrested and the retractive or return stroke in the right hand direction is initiated, at the appropriate preselected rate for the retraction of the tool from the workpiece. The lowermost bushing 156 again contacts switch SW2 on the return stroke of the slide upon the complete retraction of the tool from the workpiece, and appropriate circuits to be described are again operated so that the metered secondary oil path is by-passed and the slide continues its retractive movement at a rapid rate.

The reversal of the movement of the tool slide when it reaches the limit of its movement in the forward direction is accomplished by means of a pressure responsive switching arrangement designated generally by the numeral 157 and more particularly illustrated in FIGURE 4. As may be seen from said figure a port 158 is provided in head block 50. Said port 158 opens into the interior of the oil cylinder 49. A passageway 159 leads from port 158 to a threaded opening 160 in which there is mounted the threaded end of a conduit 161. Conduit 161 communicates with right angled fitting 162 provided with an externally threaded bushing 163 which supports a pressure responsive cylinder 164. Said cylinder receives a hollow mounting bushing 165 within which a reciprocable pin 169 is disposed and bears against the operating member 166 of micro-switch 167, which is hereinafter referred to as the pressure switch 167. The reciprocable pin 169 is projected from the cylinder 164 through bushing 165 upon the application thereto of oil under pressure, and retracts when the application of pressure is removed. The pin 169 bears against the operating member 166 of the pressure switch 167 so that the switch is correspondingly actuated and the normally open contacts thereof close when the cylinder is thus subjected to oil under pressure. The oil pressure applied to the pressure responsive cylinder 164 is derived from the forward movement of the piston in the oil cylinder. As the oil piston is forced to move forward under the influence of the air pressure applied to the air cylinder, oil pressure builds up in the forward or left hand end of the oil cylinder. This pressure is transmitted to the oil which flows into port 158 through passageway 159 and opening 160 into conduit 161 and fitting 162 whence it passes through bushing 163 and is applied to the pressure responsive cylinder 164 thereby causing it to move and project pin 169 against the operating member 166 of pressure switch 167 whereby said switch is actuated. The closing of the contacts of the pressure switch acts through an intermediate circuit arrangement, more particularly shown in FIGURE 8, and to be hereafter described, to maintain the four way air valve 79 in actuated condition until forward movement of the slide has been completed. The limit of the forward movement of the slide as heretofore stated is determined by the position of the particular threaded rod 44 in index position. This arrangement is conventional in turret lathes. The left hand end of the threaded rod 44 comes into abutment with a limit stop, not shown, and prevents the further forward movement of the tool slide. When this point is reached, the forward movement of the oil piston is also physically prevented and consequently the pressure upon the oil in front of said oil piston, in the left hand portion of the oil cylinder, drops. This pressure drop is communicated to the pressure responsive cylinder 164 which thereupon returns the pin to its initial position causing the pressure switch contacts to open. When these contacts open the circuit arrangement above referred to cause a reversal in the four way air valve 79 thereby reversing the diection of the compressed air supply to the air cylinder and consequently reversing the direction of movement of the piston assembly and tool slide.

The slide is thus returned to its initial extreme retracted position and the pressure switch remains open until pressure is again built up in the left hand end of the oil cylinder during the course of the next forward cycle of the piston assembly 40 and tool slide 32. Control over the operation of the device is further effected by means of micro-switch 1 and micro-switch 3 mounted upon arm 170 of mounting plate 43 more particularly shown in FIGURES 12-15; the functions of which will be more particularly described in connection with the associated circuitry shown in FIGURE 8. Said switches 1 and 3 are physically mounted one above the other upon arm 170 of mounting plate 43 and are provided with projecting operating members 171 and 172 adapted to be engaged with a cam plate 173 depending from the edge of crossbar 70 of piston assembly 40. Cam plate 173 is substantially L shaped and is so disposed that when the piston assembly is completely retracted, the vertical portion of the L overlies both operating members 171 and 172. When the forward movement of the piston assembly is initiated, the upper vertical portion of the L shaped cam first clears the actuating member 171 of switch 1; upon further forward movement of the piston assembly the horizontal base portion of the L shaped cam plate clears the actuating member 172 of switch 3. A timed sequence is thus established for the release of the actuating members of switches 1 and 3. By the same token upon the return stroke of the piston assembly, the cam plate first actuates switch 3 and immediately thereafter additionally actuates switch 1. When the piston assembly has thus reached its extreme retracted position both of said switches are in actuated condition.

The operation of the device will now be described, reference to FIG. 16 being helpful in following the operation of the pneumatic and hydraulic systems. Assuming the slide 32 to be at rest in its extreme retracted or right hand position, compressed air is introduced by the valve 79 into the right hand side of the air cylinder through conduit 78, opening 77 and port 76 in the distributor plate. The piston assembly comprising both the oil and air pistons, thus begin to move forward carrying the tool slide therewith. As the oil piston moves to the left, the oil in the left hand portion of the cylinder is forced to flow into port 83 in headblock 50 from whence it passes through duct 84 and into the valve bore 85. The oil then flows into oil return tube 71 and enters passageway 90 in the distributor plate 51. The main flow of oil then occurs through passageway 90 into the bore 113 of valve 111 which is in open condition, at such time permitting flow into passageway 121 through port 120. This principal flow then continues through by-pass duct 64 and returns into the right end of the oil cylinder through port 92. Under these circumstances the flow of oil around the circuit is relatively unimpeded and the piston assembly moves forward at a rapid rate by reason of the relatively unrestricted primary oil circuit thus provided. It should be noted that the amount of oil being displaced in front of the oil piston in the left hand portion of the oil cylinder is less than is required to fill the volume of the right hand portion of the oil cylinder as it is being expanded by the movement of the oil piston. This difference is due to the volume occupied by the oil piston rod in the left hand end of the cylinder. In order to compensate for this difference the pressure exerted upon the oil reservoir piston 100 by spring 107 causes a compensating amount of oil to enter the right hand portion of the oil cylinder through check valve 200. The entire system is thus kept oil filled and vacuum free. As the air cylinder moves forward under the influence of compressed air being admitted through conduit 78 and port 76, the air ahead of the air piston is being exhausted through port 73 and conduit 75 and valve 79. The rapid forward movement of the piston assembly and tool slide continues until the point is reached at which the tool in operative position in the turret is about to engage the workpiece. This point is pre-selected by appropriately positioning bushing 156 on the threaded rod 44 associated with that particular turret index position. The contact of the bushing on the lowermost threaded rod 44 with switch SW2 operates associated apparatus in the control box, and valve 111 is thereby actuated to closed position. With valve 111 thus actuated port 120 is closed off. The oil therefore emerging from the oil return tube 71 flows through vertical passage 90 into port 122 and enters circular groove 124 in the distributor block 110. The oil then passes through metering chamber 125 wherein its flow is restricted to the clearance space provided and then enters radial passage 132, flowing into depressed area 141 and around circular groove 139 into radial port 143, through 144 and into port 145 in the distributor plate. The oil then flows through passageway 126 into port 109 opening into the interior of the oil reservoir and thence into the oil cylinder through check valve 200. The amount of oil being displaced from the left hand end of the cylinder is less than the amount of oil required to keep the right hand end of the oil cylinder filled due to the presence of the oil piston and consequently oil flows from the reservoir through check valve 200 to keep the oil cylinder completely filled. The metered flow of oil through the forward secondary path is thus completed. During this period the rate of advance of the piston assembly and tool slide is controlled and determined by the setting of the metering valve arrangement for the particular index position of the lathe.

Upon the completion of the forward movement of the slide by the abutment of the rod 44 in index position with the limit stop of the lathe, the pressure of the oil in the left hand side of the oil cylinder drops and the pressure switch is de-activated and opens. As a result of the associated control arrangement, the four way valve is also moved to its alternate position thereby reversing the direction of air supply to the air cylinder through ports 73 and 76, and the piston assembly and slide therefore begin to move in the reverse direction retracting the tool from the workpiece. Simultaneously with the reversal of the air supply to the air cylinder, valve 111 is closed valve 112 is opened and port 125 is exposed by the retraction of pin 123. Oil from the oil cylinder is now discharged from the right hand side thereof into port 92 and through by-pass duct 64 and into vertical passage 121. From passageway 121 the oil flows into port 153 and enters the distributor block through port 152 flowing through radial port 154 into circumferential groove 140 and thence into the depressed area 142. Oil then flows into the radial duct 155 of the particular return metering valve in index position and enters the metering chamber 148 of that particular metering valve. The oil is metered in accordance with the previous adjustment of the valve pin 150 and thence passes into the depressed area 141, and around circumferential groove 139 into port 143, through 144 and into port 145 of the distributor plate. The metered oil then flows into vertical passageway 126 from whence it branches off through two paths. The main oil flow occurs into valve bore 114, through port 125 into vertical passageway 90, from whence it flows into oil return tube 71 and is carried back to the forward or left hand side of the oil cylinder which it re-enters through valve bore 85, duct 84 and port 83. Since the return movement of the piston in the right hand direction displaces more oil than can re-enter the left hand side thereof due to the increasing volume occupied by the returning oil piston, this excess oil flows from the branch-off point in vertical passageway 126 through said passageway into the oil reservoir 93 through port 109. In view of the expandible arrangement of the oil reservoir, this excess oil can be received therein. The metered flow of oil around the foregoing controlled return oil circuit causes the tool to be retracted from the workpiece at a pre-selected and controlled rate for the index position.

Upon the retraction of the tool from the workpiece the retractive or return movement of the slide again causes the bushing 156 of the particular threaded rod 44 in index position to strike switch SW2 thereby causing the associated apparatus to open valve 111 and retract valve pin 118 thus exposing port 120. The opening of valve 111 permits the oil entering port 92 from the right hand side of the oil cylinder to flow through said by-pass 64 and enter the oil return tube 71 through port 120, valve bore 113 and vertical passageway 90. The secondary controlled return oil metering circuit is thus by-passed and the principal flow of oil occurs through the aforesaid unrestricted primary by-pass path. The slide and piston thus return rapidly to their initial retracted position and the turret indexes to its next succeeding position, whereupon the cycle may be repeated.

The associated relays, air valves and electrical and air circuits for activating the device are housed in control box CB which is advantageously mounted upon the device as may be seen from FIGURE 1. The electrical and air circuit and the associated devices are more particularly shown schematically in FIGURE 8. As may be seen from said figure and FIGURE 14, when the piston assembly 40 is in its completely retracted position, cam plate 173 overlies the operating members 171 and 172 of switches 1 and 3 thereby closing contacts C1 and C5. With contacts C1 and C5 in closed condition relay 3 is energized through J44, J39, J37, J36, J20, J50, J1, C1, C2, J2, J3, J4, C5, J7, J6, J9, J19, C10, J20, J47, J46, coil of relay 3, J45, J40, J42, and J43. The following hold circuit is thus established: J44, J39, J37, J49, C18, J48, J38, J27, J5, J6, J9, J19, C10, J20, J47, J46, coil of relay 3, J45, J40, J42, and J43. Solenoid valve 1 is thus energized through J44, J39, J37, J49, C18, J48, J38, J27, J5, C6, J10, J11, C8, J23, the coil of solenoid valve 1, J24, J25, J29, J40, J42, and J43. By reason of the energization of solenoid valve 1, said valve opens and compressed air is supplied from the air supply through P1, P4, P5, through solenoid valve 1, P6 and P7 into conduit 112A thereby actuating valve 112. Air is also supplied to control port 82 of the four way control valve thereby actuating said valve and supplying compressed air to conduit 78 through the following air circuit: P1, P4, P8, P9 through the four way valve, emerging from port 78A into conduit 78. The piston assembly and the slide thus begin to move forward. Contacts C1 and C5 open and contact C4 is made. As the piston assembly moves forward pressure switch 167 is actuated closing contact C12 and thus actuating relay 1 through the following circuit: J44, J39, J37, J36, C12, J28, J34, the coil of relay 1, J35, J29, J40, J42, and J43. Contacts C13 and C14 close. An alternate source of energization for solenoid valve 1 is thus established through the following circuit: J44, J39, J37, J36, J20, J33, C14, J32, J27, J5, C6, J10, J11, C8, J23, coil of solenoid 1, J24, J25, J29, J40, J42 and J43.

The forward movement of the piston assembly and slide causes bushing 156 on threaded rod 44 to engage the operating member 158 of switch 2, thereby opening contact C2 and closing contact C3 instantaneously. The instantaneous closure of switch 2 energizes the coil of relay 2 through the following circuit: J44, J39, J37, J36, J20, J33, C14, J32, J27, J5, J6, J9, C3, J2, J3, J4, C4, J8, J12, J17, coil of relay 2, J16, J15, J25, J29, J40, J42, J43. The actuation of the relay opens contact C10 and closes contact C9 and C11. Simultaneously the coil of solenoid valve 2 is energized through the following circuit: J44, J39, J37, J36, J20, J33, C14, J32, J27, J5, J6, J9, C3, J2, J3, J4, C4, J8, J12, J14, coil of solenoid 2, J13, J15, J25, J29, J40, J42, J43. As a consequence of the energization of solenoid valve 2, air valve 111 is actuated by means of air supply through P1, P2, solenoid valve 2, and P3 and conduit 111A. The piston assembly thus goes into its controlled forward feed movement. Simultaneously, the whole circuit of relay 3 through contact C10 is broken, thereby de-energizing relay 3. The activation of relay 2 closes contact C9 to establish the following hold circuit: J44, J39, J37, J36, J20, J33, C14, J32, J27, J5, J6, J9, J19, C9, J18, J31, C13, J30, J3, J4, C4, J8, J12, J17, relay 2 coil, J16, J15, J25, J29, J40, J42, J43. As the bushing 156 clears member 158 of switch 2, said switch again closes contact C2 thereby opening contact C3. The slide continues its forward movement until it is halted by the abutment stop, whereupon pressure drops and the pressure switch opens. Contact C13 is thus opened and solenoid 1 is de-energized de-actuating the four-way valve and causing it to reverse the direction of air input into the air cylinder thereby initiating the return movement of the piston assembly and the slide. Air supply is also discontinued to valve 112 through conduit 112A thereby opening said valve. It should be noted that micro-switch 2 to return to its initial contact C2, thereby establishes a parallel hold circuit for relay 2 and solenoid 2 through the following circuit: J44, J39, J37, J36, J20, J50, J22, C11, J21, C2, J2, J3, J4, C4, J8, J12, J17, relay 2 coil, J16, J15, J25, J29, J40, J42, J43. The hold circuit also provides a parallel energization for solenoid 2 coil through the following circuit: J44, J39, J37, J36, J20, J50, J22, C11, J21, C2, J2, J3, J4, C4, J8, J12, J14, coil of solenoid 2, J13, J15, J25, J29, J40, J42, J43. When the piston assembly and the slide carried thereby causes bushing 156 on threaded rod 44 to again contact the actuating member 158 on switch 2, contact C2 is momentarily broken causing the hold circuit of relay 2 and solenoid valve 2 to open. When solenoid valve 2 is de-actuated, air supply to valve 111 through conduit 111A is discontinued, thereby causing said valve 111 to resume its initial position and interposing the primary by-pass oil circuit, thereby permitting the piston assembly to continue its retractive movement unimpeded and at a high rate of speed.

In order to impart additional flexibility to the operation of the device, there is provided a master switch arrangement designated MS. Switch MS is provided with a Stop, C15, Automatic C16 and Hold C17 position. When the arm J41 is in Automatic position, the device is operated normally re-cycling automatically as the turret changes index position. When the contact arm J41 of switch MS is moved to Stop position, solenoid 3 is energized thereby supplying air through P1, P4, P8, P10, P11, through solenoid operated valve 3 to conduit 81 thereby actuating air valve 88. With the actuation of air valve 88 communication between port 83 and oil return tube 71 is prevented so that no oil may now be discharged from the oil cylinder. Consequently, the piston assembly will be arrested at any point along its forward movement instantaneously upon the closing of the contact C15 by arm J41 of switch MS.

When its is desired to automatically halt the operation of the piston assembly at the end of any retractive cycle, it is merely necessary to mount an additional bushing 156 on the left hand end of the threaded rod 44 corresponding to the index position of the lathe at which it is desired to halt the piston assembly at the end of its retractive movement. The additional bushing is longitudinally positioned on the threaded rod 44 so that it contacts the operating member of 158 of switch 2 at the end of such retractive movement and rests upon said operating member. Consequently, solenoid valve 1 is prevented from being energized by reason of the open contact C2 and the reversal of the movement of the piston assembly and slide is prevented. In order to cause the piston assembly to reverse and initiate its forward movement the switch arm of MS is moved to the hold contact momentarily thereby energizing solenoid 1 and thus causing the four-way valve to reverse the direction of the air supply to the air cylinder. If the switch arm is continued in hold position on C17, the piston assembly and slide will move forward until the threaded rod 44 abuts the limit stop and will be held in this position without reversing its direction of travel. In order to have the slide begin its retractive movement the switch arm must be moved from the hold contact C17 to the Automatic contact C16.

During tapping operations it is essential to shift the speed of rotation of the spindle holding the workpiece to low speed. A lever arm HL is provided in conventional lathe construction for this purpose. In order to assure that the tool will not be premitted to engage the workpiece until such shift to low speed has been made switch 4 is provided. As shown in FIGURE 1 said switch is mounted so that when the speed shifting lever arm HL is shifted to low position a projection thereon contacts the operating member of said switch opening the contact thereof. In order to carry on a tapping operation the slide is automatically halted at the end of its retractive movement by the placement of an additional bushing 156 as heretofore described. When the slide halts at the end of its retractive movement, the reversal and forward movement thereof will be initiated upon the movement of the shift lever HL to low speed position. When so moved the contact of the projection with the operating member of switch 4 opens contact C6 and closes contact C7 as may be seen from FIGURE 8. With the contact C7 closed the following circuit is established: for energizing solenoid 1 to initiate the forward movement of the slide in the manner previously described; J44, J39, J37, J36, J20, J50, C7, J10, J11, C8, J23, coil of solenoid 1, J24, J25, J29, J40, J42 and J43. Upon the completion of the tapping operation it is necessary to reverse the spindle in order to retract the tap therefrom. With the arrangement indicated and the shifting lever HL in low speed position the slide will halt and will not reverse at the end of its forward movement. In order to initiate the return movement of the slide when the lever HL is in low speed position it is necessary to move the spindle reversing lever FR to reverse position. When this is done, the projection on the lever FR moves the operating member of switch 5 thereby opening contact C8. The circuit previously established through contact C7 is thus broken and the de-actuation of solenoid 1 will cause the four way valve to reverse the air supply to the air cylinder thereby initiating the retractive movement of the slide. In order to resume normal operation the levers are returned manually to their initial position.

It will be apparent that a compact unit has been provided to the operations heretofore described. The device is so arranged that it may be readily mounted at the most convenient position on the lathe. The unit is particularly adapted to be mounted upon the saddle member of the lathe, a feature which makes it particularly desirable. Thus the unit is mounted by means of a mounting bracket 43 having a mounting plate 43A to which headblock 50 is secured by means of screws through apertures 43B. Horizontal arms 170 and 170A of the bracket are adapted to be positioned in alignment with the slide and to be secured by screws 170C through apertures 170B. Thus, the unit may be readily mounted in close proximity to the slide for most efficient operation. The arrangement is also exceptionally stable in operation in that the outer air cylinder and the passage of air therethrough provides for constant cooling of the oil cylinder and serves to maintain it at a constant temperature. The concentric cylinders comprise a symmetrical arrangement which is especially advantageous and leads to a highly uniform and reproducible type of action. Furthermore, this arrangement permits a very significant reduction in the overall length of the device and permits the practical construction of an apparatus of this character having an extended stroke without undue increase of the overall length of the device.

I have here shown and described a preferred embodiment of my invention. It will be apparent, however, that this invention is not limited to this embodiment, and that many changes, additions and modifications can be made in connection therewith without departing from the spirit and scope of the invention as herein disclosed and hereafter claimed.

Having disclosed my invention, what I claim as new and desire to secure by Letters Patent is:

1. In a fluid pressure operated reciprocating mechanism the combination of a stationary power cylinder and a stationary control cylinder rigidly interconnected with one another and arranged in concentric relation with each other with one cylinder inside of the other to form an inner cylindrical space defined by the inner surface of the inner cylinder and an outer annular space defined by the inner surface of the outer cylinder and the outer surface of the inner cylinder, a circular piston reciprocably disposed in the inner cylindrical space, an annular piston disposed in the annular space, said pistons being rigidly interconnected for simultaneous movement, conduit means supplying an elastic fluid alternately to opposite ends of the power cylinder, conduit means including a restricted flow valve connecting opposite ends of the control cylinder, an inelastic fluid filling the control cylinder and the second-named conduit means, at least one of said pistons having a piston rod extending externally of its associated cylinder for interconnection with the mechanism to be reciprocated.

2. A hydropneumatic pressure feeding mechanism comprising a pair of concentric rigidly interconnected stationary tubes defining an annular outer power cylinder having an annular piston fitted to reciprocate therein through the medium of an elastic fluid and a governing cylinder arranged concentrically within said power cylinder and constituting the inner of the pair of tubes, said governing cylinder having the bore thereof filled with an inelastic fluid, conduit means including a restricted flow valve interconnecting opposite ends of said governing cylinder and filled with said inelastic fluid, a circular piston fitted to reciprocate within said governing cylinder, said annular piston riding on the inner surface of the outer tube and on the outer surface of the inner tube, said circular piston riding on the inner surface of the inner tube, a piston rod for each of said pistons extending externally of said cylinders, means rigidly interconnecting the pistons to each other for common movement.

3. In an apparatus for reciprocating and controlling the speed of forward and reverse movement of a reciprocable part, a stationary air cylinder constituting a pair of concentric rigidly interconnected tubes defining an annular space, an annular piston disposed therein and riding on the inner surface of the outer tube and the outer surface of the inner tube, the opposing ends of said air cylinder being provided with ports, a valve for interconnecting said ports with a source of air supply and for reversibly controlling the flow of air to and from said ports to thereby drivingly reciprocate said piston within said air cylinder, a stationary oil cylinder disposed within said air cylinder and constituting the inner one of said pair of rigidly interconnected tubes, the opposing ends of said oil cylinder being provided with oil ports, a cylindrical piston disposed in the oil cylinder and riding on the inner surface thereof, passage means interconnecting said oil ports for the circulation of oil therethrough from one end of said oil cylinder to the opposing end thereof, said passage means including a metering means for selectively restraining the rate of oil flow from one end of said oil cylinder to the opposing end thereof, said pistons being rigidly interconnected for common movement whereby the restraint imposed upon said oil piston by said metering valve is imposed upon said air piston in the course of the reciprocation thereof.

4. A reciprocating apparatus for a machine element comprising an air cylinder and an oil cylinder disposed therein in concentric relation thereto, a head block disposed at one end of said cylinders and a distributor plate disposed at the other end of said cylinders forming end enclosures therefore, an air port disposed in each of the opposing ends of said air cylinder, said air ports being interconnected with an air supply source through a four way valve in order to provide a reversible air supply for said air cylinder and to thereby cyclically reverse the direction of movement, an oil port in the head block end of said cylinder and an oil return tube providing communication from said port to said distributor plate, a primary oil path provided in said distributor plate in communication with said oil return tube for conducting oil through the distributor plate into the opposing end of said oil cylinder whereby oil disposed within said system and completely filling the same is caused to be circulated from one end of said oil cylinder to the other without material restraint thereby permitting the unrestrained reciprocation of said apparatus, a secondary oil path provided in said distributor plate, said secondary oil path being disposed within a distributor block carried by said distributor plate and in oil flow communication therewith, a plurality of metering valves disposed within said distributor block for adjustably restraining the flow of oil therethrough, whereby the rate of reciprocal movement of said apparatus is reduced, means for selectively interposing said secondary oil path in the path of flow of oil through said distributor plate and additional means for selectively interposing only one of said valves in said secondary oil path at any one time.

5. Mechanism for effecting the controlled reciprocal movement of a machine element comprising an air actuated power cylinder and an oil control cylinder, electrical and pneumatic means for controlling the air supply to said air cylinder, a circuitous oil path from one end of said oil control cylinder to the other, said circuitous oil path including primary and secondary oil paths for selective interposition in said circuitous oil path, said primary path providing for unrestrained oil flow therethrough and said secondary path providing for a selectively adjustable restrained oil flow therethrough, a plurality of adjustable metering means interposed in said secondary oil path and means for excluding all but one of said metering means from said secondary oil path at any one time, electrical and pneumatic means for controlling the path of oil flow through said circuitous oil path.

6. Mechanism for effecting the controlled reciprocal movement of a machine element comprising fluid means for advancing and returning said machine element, and hydraulic means operative to restrain the rate of advance and return of said element, said hydraulic means including a distributor block provided with a circuitous hydraulic pathway including a first series of adjustable metering valves selectively interposed in said hydraulic pathway to restrain the rate of advance of said element and a second series of adjustable metering valves selectively interposed in said hydraulic pathway to restrain the rate of return of said element and means for cyclically selecting a single one of said valves for operative interposition in said circuitous hydraulic pathway.

References Cited in the file of this patent

UNITED STATES PATENTS

| | | |
|---|---|---|
| 464,175 | Johnstone | Dec. 1, 1891 |
| 499,589 | Player | June 13, 1893 |
| 533,783 | Brameld | Feb. 5, 1895 |
| 627,385 | Brockie | June 20, 1899 |
| 897,676 | Thompson | Sept. 1, 1908 |
| 1,335,835 | Hoting | Apr. 6, 1920 |
| 1,422,767 | Keast | July 11, 1922 |
| 1,931,652 | Flanders | Oct. 24, 1933 |
| 2,008,011 | Foster | July 16, 1935 |
| 2,357,514 | Huennekens | Sept. 5, 1944 |
| 2,652,731 | Turchan | Sept. 22, 1953 |
| 2,664,859 | Green | Jan. 5, 1954 |
| 2,694,755 | Schuman | Nov. 16, 1954 |
| 2,715,389 | Johnson | Aug. 16, 1955 |
| 2,716,395 | Pettigrew | Aug. 30, 1955 |
| 2,777,351 | Johnson | Jan. 15, 1957 |
| 2,797,666 | Chubbuck | July 2, 1957 |
| 2,832,318 | Paine | Apr. 29, 1958 |
| 2,896,587 | Hause | July 28, 1959 |
| 2,920,332 | Helmke | Jan. 12, 1960 |
| 2,934,812 | Allen | May 3, 1960 |